United States Patent [19]

Berkowitz et al.

[11] 4,097,871

[45] Jun. 27, 1978

[54] TRANSVERSE RECORDING HEAD FOR MAGNETIC PRINTING

[75] Inventors: Ami E. Berkowitz, Schenectady; Joseph A. Lahut, Scotia; Jish Min Wang, Schenectady, all of N.Y.

[73] Assignee: General Electric Company, Schenectady, N.Y.

[21] Appl. No.: 754,582

[22] Filed: Dec. 27, 1976

[51] Int. Cl.² .......................... G03G 19/00; G11B 5/20

[52] U.S. Cl. .......................... 346/74.1; 360/124

[58] Field of Search .......................... 346/74.1; 360/123, 124

[56] References Cited

U.S. PATENT DOCUMENTS

| | | | |
|---|---|---|---|
| 2,841,461 | 7/1958 | Gleason | 346/74.1 |
| 3,012,232 | 12/1961 | Eckert, Jr. | 346/74.1 |
| 3,017,234 | 1/1962 | Trimble | 346/74.1 |
| 3,164,682 | 1/1965 | Anderson | 360/123 |
| 3,713,122 | 1/1973 | Taylor | 360/123 |
| 3,999,286 | 12/1976 | Richardson | 360/126 |

FOREIGN PATENT DOCUMENTS

| | | | |
|---|---|---|---|
| 387,403 | 10/1973 | U.S.S.R. | 346/74.1 |

*Primary Examiner*—Jay P. Lucas
*Attorney, Agent, or Firm*—Geoffrey H. Krauss; Joseph T. Cohen; Marvin Snyder

[57] ABSTRACT

A magnetic printing head, for selectively magnetizing regions of magnetic recording media moving transversely therepast, has an elongated comb-like member of magnetizable material. Each of a multiplicity of slots in the member contains conductor means energizable to carry a flow of current for generating a magnetic orientation field between two adjacent comb-tooth tips and transverse to the direction of media movement. The conductor means in each slot may comprise at least a pair of independently energizable conductors for generating the orientation field responsive to coincident flows of current therein, preferably selected by matrix techniques.

12 Claims, 7 Drawing Figures

Fig. 1a
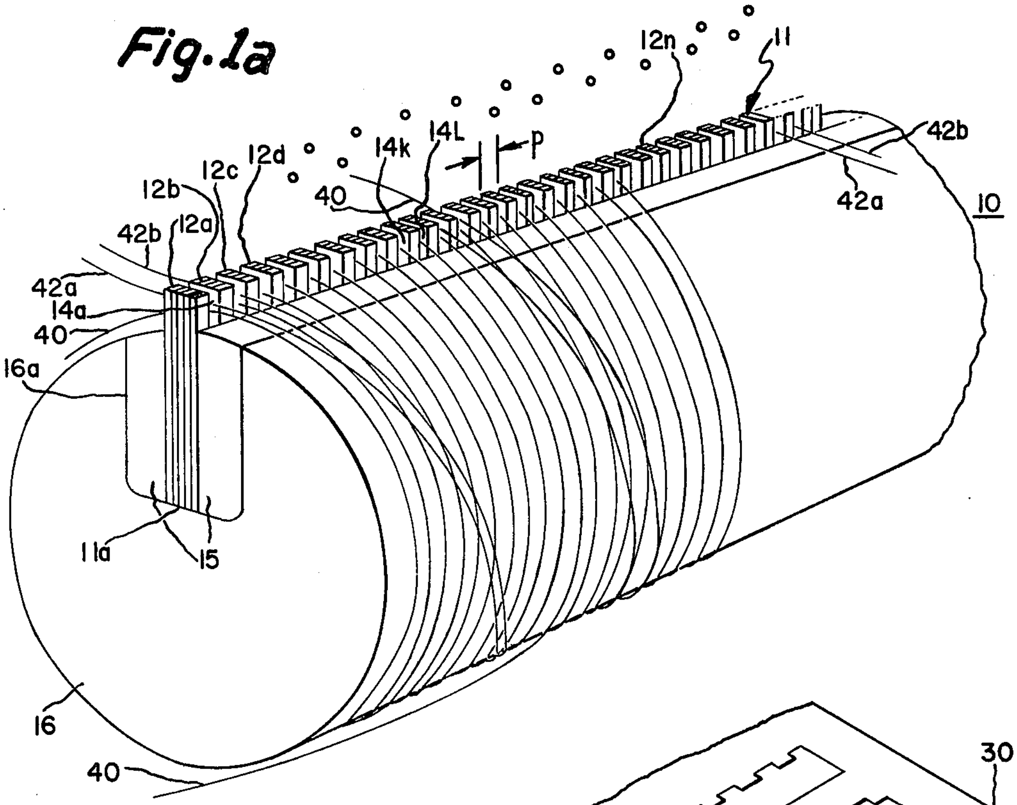
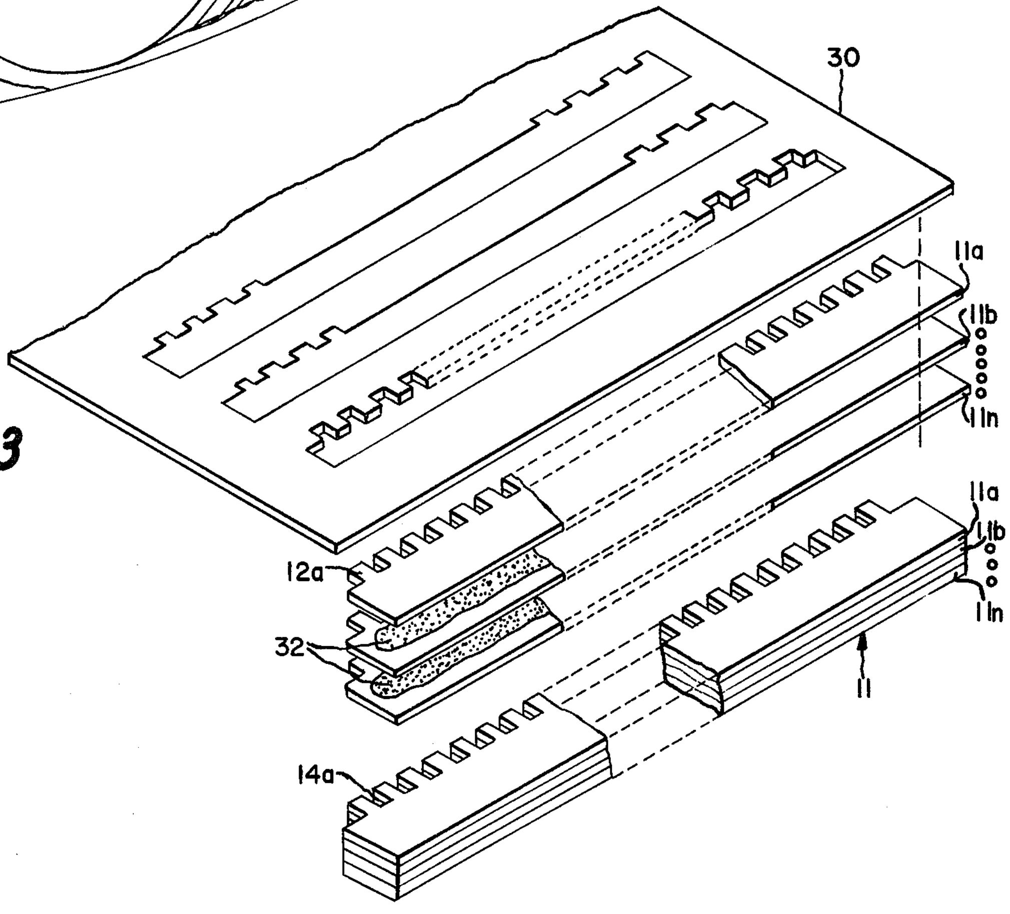
Fig. 3

Fig.4a
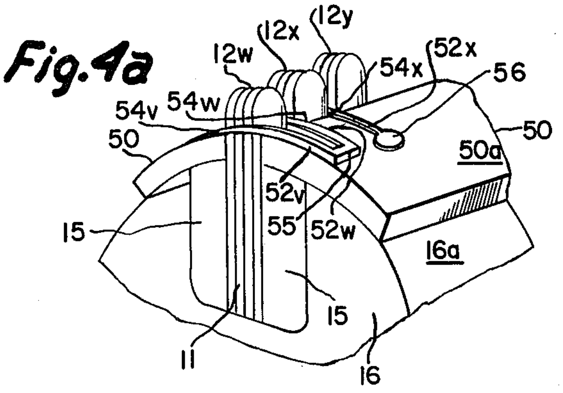
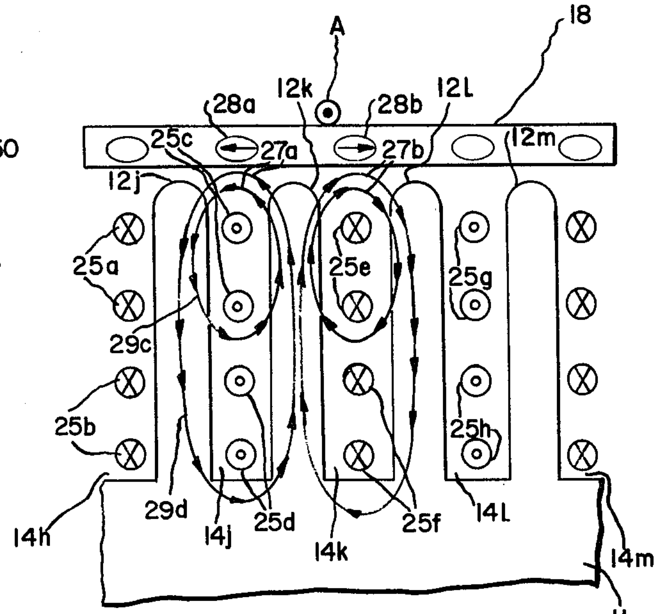
Fig.2
Fig.4b
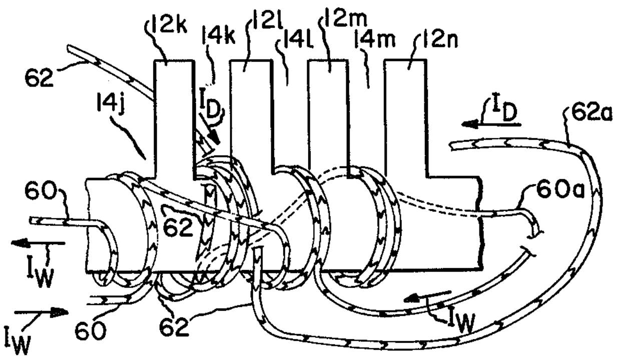
Fig.5
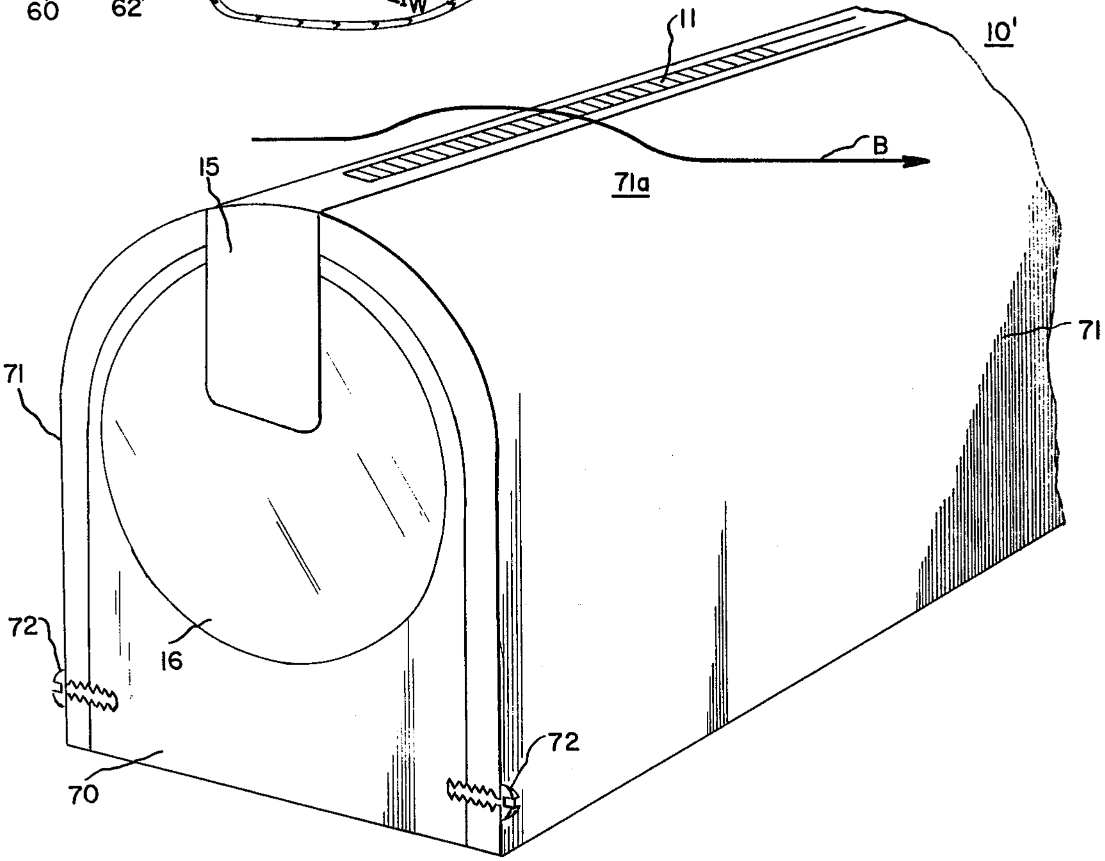

TRANSVERSE RECORDING HEAD FOR MAGNETIC PRINTING

BACKGROUND OF THE INVENTION

The present invention relates to magnetic printing and, more particularly, to a novel magnetic printing head for selectively magnetizing regions in a belt of magnetizable material traveling in a direction transverse to the elongated dimension of the printing head.

Magnetic printers may conveniently utilize a belt of magnetizable material traveling past an elongated printing head; regions in the magnetizable material of the tape are magnetized responsive to each of a serially arranged multiplicity of magnetic fields generated by the printing head to impart information to the belt for printing purposes. The magnetization patterns on the belt subsequently cause magnetic "ink" to be transferred to the belt and subsequently to a medium, such as a paper sheet and the, like for permanent recordation of the data patterns required.

Known magnetic printer recording heads are generally difficult to fabricate, in that the elongated magnetizable element requires precision machining and a relatively large number of windings (about 1600 individual windings for a 16 inch long printing head capable of recording 10 characters per inch with 10 recordable, sequentially aligned recording positions per character) must be used, each being part of a complex winding pattern, resulting in low yield. The yield is further reduced in recording heads of the type magnetizing the belt in the direction of movement (as disclosed, e.g., in pending U.S. application Ser. No. 716,087, filed Aug. 20, 1976 and assigned to the assignee of the present invention) which printing head, while offering advantageous performance factors, requires winding of wire arrays with multiple orthogonal directional offsets to achieve the windings for each data position. It is desirable to retain the relatively high performance of such a magnetic printing head while increasing yield and decreasing fabrication costs.

BRIEF SUMMARY OF THE INVENTION

In accordance with the invention, a magnetic printing head for selectively magnetizing regions of a magnetizable recording medium in a direction transverse to a direction of movement of the recording medium past the printing head, comprises an elongated member fabricated of magnetizable material and having a multiplicity of substantially equally spaced slots formed into an edge thereof closest to the moving magnetic medium. At least one conductor carries a flow of electric current through each slot of the comb-like elongated member to cause formation of each of a plurality of magnetic fields, each serially arranged adjacent to the open end of the associated slot and along the elongated dimension of the member, to magnetize a correspondingly small portion of the adjacent magnetic medium in a desired direction. The orientation field may be generated responsive to matrix-coincident flows of current in at least a pair of independently energizable conductors emplaced in each slot between a pair of adjacent comb-teeth; at least the field-forming portions of the conductors extend substantially in the direction of recording medium travel, whereby the magnetic field between two adjacent comb-teeth is transverse to the direction of travel of the overlying magnetic medium. In the simplest embodiment; an independently energizable conductor in each slot carries a flow of current therethrough, e.g. a linear array of 1600 slots requires 1600 individual and independent conductors. Thus, each embodiment of the novel head of the present invention writes transverse to the direction of belt travel.

In one preferred embodiment, the multiplicity of slots is divided into a plurality of word groups, each having an equal number of slots assigned thereto, with each slot of a word group containing one of a first plurality of word lines; a second plurality of digit lines are arranged whereby each digit line is contained in a similarly ordered single slot of each word-grouped block of slots. Each of the word and digit lines is wound in bifilar fashion, whereby the direction of winding of a conductor in sequential slots is alternated, to minimize the inductance of each of the word and digit lines, and facilitate higher printing speeds.

In another preferred embodiment, each of a pair of flexible insulating substrates is arranged along an opposite side of the elongated member to support conductive interconnection patterns including conductive portions emplaced within each slot and utilizing "zig-zag" conductor patterns to achieve alternating directions of current flow in adjacent slots to minimize undesirable magnetic effects.

Accordingly, it is one object of the present invention to provide a novel magnetic printing head for selectively magnetizing regions of an overlying magnetizable medium in a direction transverse to the direction of medium travel.

It is another object of the present invention to provide a novel transverse magnetic printing head utilizing a coincidence matrix conductor array.

It is still another object of the present invention to provide a novel transverse magnetic printing head having a substantially reduced inductance associated with any current-carrying conductor thereof.

It is a still further object of the present invention to provide a novel transverse magnetic printing head having means for supporting current-carrying conductors without requiringwinding of a conductor about a magnetizable member.

These and other objects of the present invention will become apparent upon a consideration of the following detailed description and the corresponding drawings.

BRIEF DESCRIPTION OF THE DRAWINGS

FIG. 1*a* is a perspective view of a portion of the mechanical configuration of one embodiment of a novel transverse magnetic printing head;

FIG. 2 is a schematic side view of the elongated member and several of the current-carrying conductors of a matrix-driven embodiment of our novel transverse magnetic printing head and useful in understanding the operation of the present invention;

FIG. 3 is a perspective view illustrating the fabrication of a laminated, elongated magnetizable member for use in the transverse magnetic printing head of the present invention;

FIGS. 4*a* and 4*b* are illustrations of two preferred arrangements of current-carrying conductors contained within the slots of the elongated member, in accordance with the principles of the present invention; and FIG. 5 is a perspective view of a completed transverse magnetic recording head in accordance with the present invention.

DETAILED DESCRIPTION OF THE INVENTION

Figure 1:
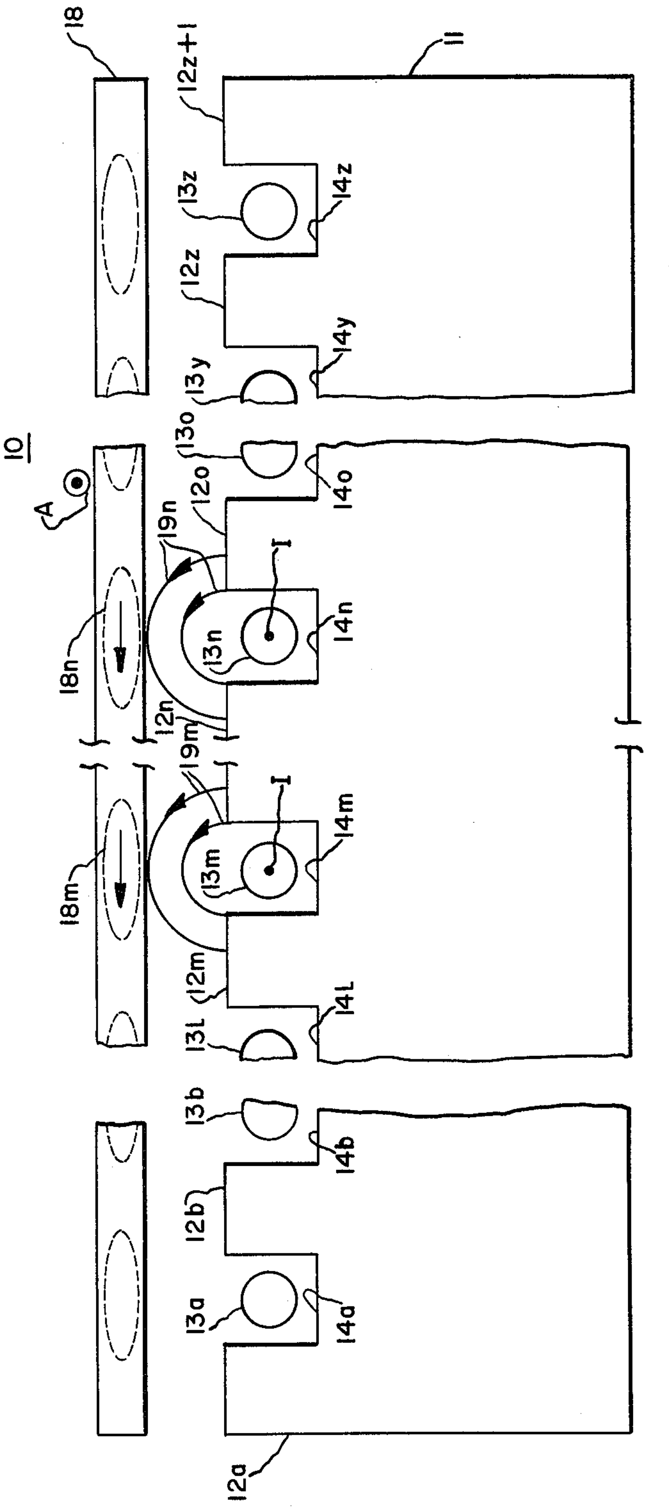
FIG. 1 is a side view of the magnetizing field generating elements of a novel transverse magnetic printing head in accordance with the principles of the invention, and illustrating the operating principles thereof.

Referring initially to FIGS. 1 and 1*a*, one embodiment of transverse magnetic printing head 10 comprises an elongated member 11 of magnetic material, such as ferrite and the like, fabricated into a comb-like shape having a plurality of teeth 12*a*–12*z* extending from one side thereof to form a plurality of slots 14*a*, . . . , 14*m*, 14*n* . . . , (each slot being bounded by a pair of adjacent teeth 12). One of a like plurality of conductors 13 is placed in each slot 14. A support means 15 abuts the side surfaces of the elongated member from its bottom 11*a* to a line immediately below each of slots 14. Support means 15 is formed of a non-magnetic, insulative material such as an epoxy and the like. Dependent upon the total length of elongated member 11, and the mechanical rigidity thereof to be maintained, an additional support means, such as a rod 16 may be utilized; the additional support member is shaped, as by formation of a recess 16*a* radially therein, to closely receive support means 15 and elongated member 11.

A sheet 18 of a material is magnetizable, in each of an array of small areas (e.g. 18*m* and 18*n*) thereon, in each of at least a pair of opposite magnetic directions. The sheet is caused to travel in a direction, indicated by arrow A out of the plane of the drawing, transverse to the direction defined by, and adjacent to the ends of, the elongated multiplicity of comb-teeth 12.

Each of the plurality of conductors 13*a*–13*z*, each extending through an associated one of slots 14*a*–14*z*, is driven by a separate current-driver means (not shown) to independently carry a flow of current therein in the same direction as the direction A of sheet travel (illustratively, out of the plane of the drawing). A flow of current of a selected magnitude and polarity through a conductor, e.g., 13*m* or 13*n*respectively, results in a magnetic field being generated. The field is concentrated by the magnetizable material of adjacent comb-teeth 12 to form a final magnetic field 19 of sufficient magnitude and direction (illustratively, counterclockwise) between the tips of adjacent teeth, e.g., magnetic field 19*m* formed between the ends of teeth 12*m* and 12*n*, and magnetic field 19*n* between teeth 12*n* and 12*o*, respectively, to magnetize the magnetizable material of an overlying region, e.g., 18*m* or 18*n*, respectively, of sheet 18 in a desired direction.

Referring now to FIG. 2, it is preferable, in order to reduce the number of current-driving means, that each slot house a group of conductors 25, with each group being formed of two sets of independently driven conductors: a first set of current-carrying conductors, e.g. 25*a*, 25*c*, 25*e*, . . . , respectively positioned in sequential slots 14*h*, 14*j*, 14*k*, . . . being completely independent from a second set of current-carrying conductors, e.g., 25*b*, 25*d*, 25*f*, . . . , respectively arranged in the same sequential set of slots 14. Each set of conductors may consist of a single turn or a plurality of turns (as shown) in each slot.

By use of coincident-matrix techniques, the required magnetic field, e.g., magnetic field 27*a* for magnetizing sheet region 28*a* adjacent thereto, achieves a required field amplitude and direction only when the individual magnetic fields, e.g., 29*c* and 29*d*, are generated in the same direction, e.g., counterclockwise, by flow of substantially equal currents in the proper direction, e.g., out of the plane of the drawing of FIG. 2, in each independent set of conductors, e.g., 25*c* and 25*d*, associated with the slot at which magnetic field 27 is to be formed.

Referring now to FIG. 3, elongated member 11 is preferably fabricated by laminating together a plurality of thin comb-like sheets 11*b*, 11*c*, . . . , 11*n* of a high permeability material. The individual sheets may be etched from a master sheet 30 of the desired material and may be stacked one upon the other with similarly ordered teeth 12 in alignment. Adhesive means 32, such as epoxy and the like, is advantageously spread upon the interior sheet surfaces to facilitate bonding of the laminations to each other. A tiny bead of the adhesive may be squeezed from between the overlying sheets, during lamination, to provide additional insulation between the elongated member and the insulated conductor 13 in each slot.

Returning to FIG. 1*a*, printing head 10 may be considered to be comprised of an array of a multiplicity N×M of recording heads, each head having an effective area across the gap of one of slots 14. The array is organized into N words of M digits each. Thus, an array of 1600 recording heads may be organized into 40 (=N) words, each word having a total of 40 (=M) digits. A word line 40 is independently wound through the M sequential slots of each of the N sequential words, while each of N digit lines 42 is independently and successively wound through a like ordered slot of each of the N word groups. We have found that a unidirectionally helical-wound word or digit line, e.g., consistently wound in the clockwise direction as shown in FIG. 1*a*, is normally unacceptable as each line acts with the enclosed magnetizable material of member 11 to produce undesirable magnetic effects in the regions at the end of at least each word-group of slots. This deleterious effect is overcome if the current in the conductor in alternating slots is flowing in opposite directions. Thus, a first word line 40 is sequentially wound in alternating directions through each of the first 40 slots 14, with a second, third, . . . , N-th word line being respectively wound in "zig-zag," i.e., alternating, directions through the sequential array of slots starting at, respectively, the 41st, 81st , . . . , $40\times(N-1)+1$st slot and ending, respectively, at the 80th, 120th, . . . , 40Nth slot. A first digit line 42*a* is wound in alternating directions through the first slot of each word group, i.e., the 1st, 41st, 81st, 121st, . . . $40(N-1)+1$st slot 14 in such manner as to carry current, when driven, in the same direction as the direction of word line, which direction alternately reverses in slot-by-slot fashion, as hereinabove explained. Similarly, the second digit line 42*b* is wound through the second slot of each word group, i.e., the 2nd, 42nd, 82nd, . . . , $40\times(N-1)+2$nd slot of the array. Thus, a flow of half the total current required for magnetizing field formation may be caused in one word line 40 and one digit line 42 to generate the necessary orientation field only across the single slot wherein both the current-carrying lines are disposed. The pitch P between each slot centerline is chosen for the required "dot" spacing necessary for the size of the required indicia to be printed. It should be understood that, with uniform pitch P, the alternating-direction digit and word lines may be easily machine wound, as the wires are positioned straight through each slot 14 and do not require intricate bends or the like complex configurations in the region of the slots. The resulting small number of total lines are thus organized in a manner to be addressed by coincident 2D matrix selection techniques, whereby one current-driving means, of known type, is required for each of M word lines and for each of N digit lines for a total of 80(=N+M) current driving means.

Advantageously, each set of word or digit lines may be selected by a driver-switch matrix, e.g., a 5×8 driver-switch matrix being utilized to select the proper one of each of the set of 40 digit or word lines, respectively, by rippling through both sets of lines in accordance with sequential clocking techniques. This approach requires the least number of drivers, e.g. a total of 26, but may require a clock rate as rapid as about 2.6 MHz. for a printing speed of about 6000 lines (of up to 160 characters, at 10 characters per inch with a 16 inch long printing head 10) per minute. The clock rate can be reduced to about 65 KHz. by parallel data processing wherein either the digit lines or the word lines, respectively, are sequentially selected by the 5×8 driver-switch matrix while all of the word lines or digit lines, respectively, are simultaneously selected to respectively cause simultaneous writing of one digit in each of the 40 word blocks across the array or, with simultaneous selection of the digit lines, to cause one 40 digit word block to be printed at the same instant. Either method requires a total of 53 driving means, for the 1600 character recording head organized with 40 word lines and 40 digit lines.

Referring now to FIG. 4*a*, a preferred embodiment of a printing head having alternating-direction windings in alternating slots, with independent winding of each of the word and digit lines for matrix selection, utilizes a pair of spaced-apart insulative members 50, each affixed, as by adhesive means (not shown), to the curved surface 16*a* of additional support member 16 and each lying adjacent to an opposite side of elongated member 11. A plurality of conductive lead means 52 are fabricated, as by printed circuit techniques and the like, upon the outermost surface 50*a* of each insulator 50; each insulative member supports a member of conductive members 52 equal in number to the number of slots 14 between the totality of teeth 12. Each pair of aligned lead means 52 is integrally joined by a short length 54 of the lead means conductor attached therebetween and aligned with one of slots 14, to facilitate insertion of each of the plurality of conductors 54 in the associated one of the sequential slots of the elongated array. Thus, a linear strip of insulative material is removed from a sheet of such material after fabrication of lead means 52, including lengths 54, to form spaced insulators 50 having a slot therebetween for receiving teeth 12. The slot is overlayed with the plurality of lengths 54 of the conductor material. Thus, a first length, e.g., 54*v*, integrally extends between a first pair of aligned conductor means, e.g., 52*v*—52*v*, when the underlying insulative materials is removed, to allow insertion in a first slot, e.g., 14*b*. The next following conductor, e.g., 54*w*, is formed by the conductive material integrally extended between the next following pair of aligned conductor means, e.g., 52*w*-52*w*, for insertion in the next following slot, e.g., 14*w*, while a subsequent conductor means, e.g., 54*x*, extends between the associated aligned conductor means e.g., 52*x*-52*x*, and so forth.

The conductor pattern fabricated on insulators 50—50 includes pattern portions 55 for alternatingly connecting portions 54 in "zig-zag" manner to achieve the required alternate-slot current-direction reversal, i.e., the current flowing rightwardly in portion 54*v* is caused to flow leftwardly in portion 54*w*, and so forth, by placement of portions 55 therebetween. Means, such as solder pads 56 and the like, may be provided for connecting an external current-driver means to each current-carrying conductor pattern 54 with a single pair of connecting pads associated with each word or digit line. It should be understood that a second set of insulative means bearing other conductor means and their integrally extended conductor portions therebetween is overlayed upon insulators 50—50 (bearing the word lines) to provide the second group, e.g., the digit lines, of matrix conductors in each slot.

Referring now to FIG. 4*b*, we have found that a particularly advantageous embodiment, for use with solid-state drivers, utilizes wound conductive-wire digit and word lines, each having a plurality of conductor turns positioned within each sequentially ordered slot 14 to reduce the required coincidence current by increasing the number of field-generating turns per slot. In the preferred embodiment, alternating slots receive turns wound in opposite directions, i.e., a bifilar wound coil, whereby the total inductance seen by the driver is reduced. Thus, a word drive line 60 is wound about magnetizable member 11 initially in a first direction, e.g., clockwise for two turns in every other slot 14*a*, . . . , 14*k*, 14*m*, . . . , and upon reaching the end of the member is reversed, as at 60*a*, and thence wound the required number of turns in the opposite direction in each remaining, alternating slot, e.g., wound counterclockwise for two turns in remaining slots 14*l*, 14*j*, . . . , 14*b*. It should be understood that such techniques must be utilized for both word and digit lines, whereby both lines carry current in the same direction through each slot. The remaining (digit) line 62 is thus also wound in opposite directions in each sequential pair of associated slots, e.g., clockwise in slot 14*k* and reversed, as at 62*a*, to be wound counterclockwise in the next slot receiving that line. Thus, when one line carries current into the plane of the drawing in alternating slots, e.g., dual conductor turns 25*a* (FIG. 29 in slot 14*h* and dual conductor turns 25*e* in slot 14*k*, and carries a current flow out of the plane of the drawing (towards the observer) in the remaining slots, e.g., slots 14*j* and 14*l*, the remaining conductor set must simultaneously also carry current into and out of the plane of the drawing in the same direction, e.g., into the drawing plane as at conductor sets 25*b* and 25*f* respectively in slots 14*h* and 14*k* and out of the plane of the drawing as in conductor pairs 25*d* and 25*h* in slots 14*j* and 14*l*. Thus, as previously mentioned, the magnetic field in, for example, slot 14*j* is counterclockwise responsive to current flowing in each of conductors 25*c* and 25*d* to each form a magnetic field 29*c* and 29*d*, respectively, of about half the required magnitude of the total magnetizing field 27*a*. The in-phase fields add to form field 27*a* of the required amplitude to magnetize a small region 28*a*, of the overlying media 20, to have a magnetic vector opposite to the magnetic vector in an adjacent region 28*b*, responsive to inward flow of current in conductors 25*e* and 25*f* in slot 14*k*, which establishes printing magnetic field 27*b* of clockwise orientation in slot 14*k*.

Referring now to FIG. 5, a complete printing head assembly 10' may advantageously utilize a light-weight, substantially rigid backing member 70, formed of epoxy and the like, to further support elongated magnetizable member 11, and its insulative support member 15 and additional support member 16. Backing member 70 is shaped so as to permit curved members 71 to be attached, as by fastening means 72, to provide a smooth curved exterior surface 71*a*, adjacent to the ends of teeth 12, upon which surface magnetic media 18 travels, as along a path indicated by arrow B, in close proximity to the elongated magnetizable member 11 for selective media area orientation thereby. The cover members 71 are formed of an abrasion-resistant material to reduce wear of the printing head as the media follows path B thereover.

While the present invention has been described with reference to several preferred embodiments thereof, many variations and modifications will now become apparent to those skilled in the art. It is our intent, therefore, to be limited not by the present disclosure herein, but only by the scope of the appending claims.

What is claimed is:

1. A magnetic printing head for selectively simultaneously magnetizing at least one of a multiplicity of regions of a relatively thin magnetizable recording belt in a direction transverse to a direction of essentially linear movement of the recording belt past the stationary printing head, comprising:

an elongated member of magnetizable material and having a multiplicity (N×M) of linearly arrayed slots formed into an edge thereof closest to the moving magnetic belt, said multiplicity of slots being divided into a plurality (N) of sequential word groups each containing a like number (M) of ordered slots;

a plurality (N) of conductive word lines, each arranged within the plurality of ordered slots of a different one of a plurality of word groups of slots, each word line independently and selectively energizable for carrying an electrical current of magnitude less than the magnitude of current required to selectively form a magnetic field of magnitude sufficient to magnetize one of the regions of said belt adjacent to an open end of each slot of said plurality of slots in each said word group; and a plurality (M) of conductive digit lines, each arranged within a like ordered slot of all of said plurality of word groups, each digit line independently and selectively energizable for carrying another electrical current of magnitude less than the magnitude of current required to selectively form a magnetic field of magnitude sufficient to magnetize one of the regions of said belt adjacent to the open end of each slot containing that digit line;

at least one word line and at least one digit line being independently and simultaneously energized to cause formation of a magnetic field of direction essentially transverse to the direction of linear motion of the belt and of magnitude sufficient to magnetize each region of said belt adjacent to those of said slots containing the simultaneously energized lines.

2. A magnetic printing head as set forth in claim 1, wherein said multiplicity of slots are substantially equally spaced along the length of said elongated member.

3. A magnetic printing head as set forth in claim 1, wherein each of said word and digit lines is respectively wound in bifilar fashion both in alternating directions about said member and through sequentially alternating ones respectively of said slots of each said word group and of each ordered sequence of word-grouped slots.

4. A magnetic printing head as set forth in claim 3, wherein said multiplicity of slots are substantially equally spaced along the length of said elongated member.

5. A magnetic printing head as set forth in claim 1, further comprising flexible insulating substrate means arranged along each opposed side of said elongated member; and wherein each of said word and digit lines comprises a plurality of conductive interconnection patterns at least partially supported by said flexible insulating substrate means and including a plurality of conductive portions each in alignment with the others and each extending through at least one of said plurality of slots; said plurality of conductive patterns being arranged to cause current to flow in opposite directions in alternating ones of said plurality of slots through which said conductive portions pass.

6. A magnetic printing head as set forth in claim 1, further comprising insulative means for supporting said elongated member.

7. A magnetic printing head as set forth in claim 6, further comprising additional support means for supporting said elongated member and said insulative means.

8. A magnetic printing head as set forth in claim 7, wherein said additional support means comprises an elongated support member having a recess formed therein to closely receive said elongated member and said insulative means.

9. A magnetic printing head as set forth in claim 1, further comprising a pair of members, each positioned adjacent to a different side of said elongated member, and having a shape selected to facilitate movement of said overlying magnetic belt adjacent to said elongated member.

10. A magnetic printing head of claim 1, wherein all of the N word lines are simultaneously energizable and the M digit lines are energizably addressed by coincident 2-D matrix techniques to cause simultaneous magnetization of up to N separate regions of the belt along the length of said member.

11. The magnetic printing head of claim 1, wherein all of the M digit lines are simultaneously energizable and the N word lines are energizably addressed by coincident 2-D matrix techniques to cause simultaneous magnetization of up to M separate regions of the belt along the length of said member.

12. The magnetic printing head of claim 1, wherein each word line and digit line comprises a plurality of conductor turns positioned in each slot through which that particular word or digit line passes.

* * * * *